(12) United States Patent
Moughabghab et al.

(10) Patent No.: US 9,501,610 B2
(45) Date of Patent: *Nov. 22, 2016

(54) INTEGRATED CIRCUIT DESIGN USING DYNAMIC VOLTAGE SCALING

(71) Applicant: Entropic Communications, LLC, Carlsbad, CA (US)

(72) Inventors: Raed Moughabghab, Carlsbad, CA (US); Branislav Petrovic, Carlsbad, CA (US); Michael Scott, Carlsbad, CA (US)

(73) Assignee: Entropic Communications LLC, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/994,028

(22) Filed: Jan. 12, 2016

(65) Prior Publication Data

US 2016/0125123 A1    May 5, 2016

Related U.S. Application Data

(63) Continuation of application No. 14/503,821, filed on Oct. 1, 2014, now Pat. No. 9,235,678.

(60) Provisional application No. 61/885,976, filed on Oct. 2, 2013.

(51) Int. Cl.
    *G06F 9/455*    (2006.01)
    *G06F 17/50*    (2006.01)

(52) U.S. Cl.
    CPC ......... *G06F 17/5081* (2013.01); *G06F 17/505* (2013.01); *G06F 2217/78* (2013.01)

(58) Field of Classification Search
    USPC .......... 716/51, 106, 107, 108, 109, 111, 113, 716/133, 134
    See application file for complete search history.

(56) References Cited

U.S. PATENT DOCUMENTS

| 8,531,225 B1* | 9/2013 | Hussain | H03K 5/133 327/276 |
| 2013/0117589 A1* | 5/2013 | Satyamoorthy | G06F 1/324 713/320 |

* cited by examiner

*Primary Examiner* — Brian Ngo
(74) *Attorney, Agent, or Firm* — McAndrews Held & Malloy

(57) ABSTRACT

Methods and systems for integrated circuit design using dynamic voltage scaling may comprise (a) designing an IC to meet a voltage dependent frequency specification, the IC design including feedback circuitry for controlling a power supply voltage to a fabricated instance of the IC design, (b) characterizing a fabrication process for corner lots for the IC design at a range of power supply voltage levels achievable by the feedback circuitry; (c) validating the IC design against the fabrication process if the frequency specification is achievable for essentially all instances of the IC design fabricated, wherein the feedback circuitry in each IC resulting from the IC design is operable to respectively adjust the power supply voltage of each IC resulting from the IC design by reducing the power supply voltage if the IC is from a fast corner lot and increasing power supply voltage if from a slow corner lot.

15 Claims, 10 Drawing Sheets

| Vdd | NOM, 27°C | SLOW, 27°C | FAST, 27°C | SLOW, -40°C | FAST, 125°C |
|---|---|---|---|---|---|
| 0.90 | 0.77 | 0.55 | 1.07 | 0.48 | 1.16 |
| 0.95 | 0.89 | 0.66 | 1.20 | 0.59 | 1.27 |
| 1.00 | 1.00 | 0.75 | 1.32 | 0.70 | 1.39 |
| 1.05 | 1.11 | 0.86 | 1.43 | 0.82 | 1.48 |
| 1.10 | 1.23 | 0.98 | 1.55 | 0.93 | 1.57 |

Normalized Fmax vs. Vdd voltage at listed process corner and temperature

FIG. 2

| Vdd | NOM, 27°C | SLOW, 27°C | FAST, 27°C | SLOW, -40°C | FAST, 125°C |
|---|---|---|---|---|---|
| 0.90 | 0.77 | 0.55 | 1.07 | 0.48 | 1.16 |
| 0.95 | 0.89 | 0.66 | 1.20 | 0.59 | 1.27 |
| 1.00 | 1.00 | 0.75 | 1.32 | 0.70 | 1.39 |
| 1.05 | 1.11 | 0.86 | 1.43 | 0.82 | 1.48 |
| 1.10 | 1.23 | 0.98 | 1.55 | 0.93 | 1.57 |

Normalized Fmax vs. Vdd voltage at listed process corner and temperature

FIG. 3

| Module | cell area without DVS' | cell area with DVS' |
|---|---|---|
| CortexA9MP | 0.7028 mm$^2$ | 0.5704 mm$^2$ |

FIG. 4

| Condition | Total Power(mW) | | Mode |
|---|---|---|---|
| | Typical | Max | |
| RxON_TxOFF without DVS' | 495.8 | 546.7 | MoCA2 |
| | 399.8 | 445.9 | MoCA1 |
| RxON_TxOFF with DVS' | 405.3 | 450.1 | MoCA2 |
| | 336.8 | 378.2 | MoCA1 |
| RxOFF_TxON without DVS' | 236.1 | 269.5 | MoCA2 |
| | 235.1 | 268.5 | MoCA1 |
| RxOFF_TxON with DVS | 203.1 | 232.8 | MoCA2 |
| | 202.1 | 231.7 | MoCA1 |

FIG. 5

| Module | WNS | | StdCell Area (x1000) | | | StdCell Count (x1000) | | | ULVt | |
|---|---|---|---|---|---|---|---|---|---|---|
| | Std | DVS' | Std | DVS' | Diff | Std | DVS' | Diff | Std | DVS' |
| me_buf | -241 | -231 | 308 | 250 | -19% | 196 | 180 | -9% | 23% | 0% |
| vblb | -63 | -17 | 864 | 725 | -16% | 585 | 553 | -5% | 28% | 0% |
| mc | 0 | -78 | 375 | 293 | -22% | 255 | 239 | -6% | 25% | 0% |
| venc | -373 | -303 | 1191 | 917 | -23% | 789 | 696 | -12% | 40% | 0% |
| vdec | -613 | -239 | 1342 | 1015 | -24% | 905 | 783 | -14% | 39% | 0% |

12 Track Conventional (Std) to 10 Track DVS' IC Design Comparison

FIG. 6

| Module | WNS | | Std Cell Area (x 1000) | | | Std Cell Count (x1000) | | | ULVt | |
|---|---|---|---|---|---|---|---|---|---|---|
| | Std | DVS' | Std | DVS' | Diff | Std | DVS' | Diff | Std | DVS' |
| usb_top | -17 | -70 | 615 | 539 | -12% | 592 | 518 | -13% | 9% | 0% |
| ccpu_m_ | -0.17 | -8 | 331 | 300 | -9% | 270 | 250 | -7% | 17% | 0% |

10 Track Conventional (Std) to 10 Track DVS' IC Design Comparison

FIG. 8

INTEGRATED CIRCUIT DESIGN USING DYNAMIC VOLTAGE SCALING

CROSS-REFERENCE TO RELATED APPLICATIONS/INCORPORATION BY REFERENCE

This application is a continuation of application Ser. No. 14/503,821 filed on Oct. 1, 2014, which makes reference to and claims priority to U.S. Provisional Application Ser. No. 61/885,976 filed on Oct. 2, 2013, each of which is hereby incorporated herein by reference in its entirety.

BACKGROUND (1) Technical Field

This disclosure relates to electronic circuits, and more particularly to integrated circuit designs and methods of design.

(2) Background

The translation of integrated circuit designs from circuit diagrams or hardware programming code to working integrated circuits (IC's) implemented in modern transistor technologies remains as much art as engineering. A significant challenge in fabricating IC's is to control circuit parameters (such as delay, transistor threshold voltage, and transistor transconductance parameters) in view of variations in the semiconductor fabrication process, IC supply voltage, and IC operating temperature (often abbreviated as "PVT", for "Process", "Voltage", and "Temperature" parameters).

Process variations during IC manufacture can cause unpredictable and undesired variations of circuit parameters, which can adversely affect circuit performance. Process variation is the naturally occurring variation of the attributes of transistors (e.g., length and width dimensions, film and oxide thickness, doping concentrations, etc.) when integrated circuits are fabricated. In addition, the parameters of individual transistors vary from wafer-to-wafer (interprocess variation) and die-to-die (intraprocess variation). Process variation becomes particularly important at smaller process nodes (<65 nm) as the variation becomes a larger percentage of the full length or width of the devices and as feature sizes approach fundamental dimensions, such as the size of atoms and the wavelength of usable light for patterning lithography masks.

All of the above parameters and variables generally exhibit complex relationships among each other. For example, attaining homogeneous transistor operating parameters, such as threshold voltage and transconductance, within an integrated circuit is one of the most important, yet most difficult, objectives for precision analog circuits. As another example, transistor threshold voltage is very critical in determining propagation speed for high speed, low voltage digital circuits.

In other words, circuit parameters tend to be process dependent. Thus, it is useful for a manufacturer to be able to quantify or determine process variations applicable to a particular IC design, taking into account a range of supply voltages and operating temperatures, in order to meet a design specification and maximize IC die yields for that design.

An important aspect of determining PVT parameters for an IC design is to determine "process corners" before commencing large scale production. A process corner refers to measured and categorized variations of various parameters used in applying an integrated circuit design to a semiconductor wafer. Process corners represent the extremes of these parameter variations within which a circuit that has been etched onto a wafer must function correctly. A circuit running on devices fabricated at these process corners may run slower or faster than specified and at lower or higher temperatures and voltages, but the current design standard is that if the circuit does not function at all at any of these process extremes, the design is considered to have inadequate design margin (i.e., acceptable ranges of circuit parameters that result in fully functional IC's that meet all design specifications at specified PVT extremes) and must be redesigned. Indeed, in order to make sure that an IC design can be successfully fabricated in a selected implementation technology, a manufacturer may choose a very conservative design margin that results in a higher die yields of IC's but with less than optimum performance levels or power consumption.

In order to verify the robustness of an integrated circuit design, semiconductor manufacturers fabricate "corner lots", which are groups of wafers that have had process parameters adjusted to various extremes, and will then test the devices made from these special wafers at varying increments of environmental conditions, such as voltage, clock frequency, and temperature, applied in combination (two or sometimes all three together) in a process called characterization. The results of these tests are analyzed in various known ways to determine the boundary limits beyond which a device begins to functionally fail or fails to meet the design specification for one or more particular combinations of environmental conditions.

One naming convention for process corners for field-effect transistor (FET) based IC's is to use two-letter designators, where the first letter refers to the N-channel MOSFET (NMOS) corner and the second letter refers to the P-channel (PMOS) corner. In this naming convention, three types of corners exist: "typical", "fast", and "slow". Fast and slow corners exhibit carrier mobilities that are higher and lower than normal, respectively. There are therefore five possible corners: typical-typical (TT) (not really a corner of an N versus P mobility graph, but called a corner, anyway; the "TT" corner is the center "corner" where wafers are normally produced using typical process parameters), fast-fast (FF), slow-slow (SS), fast-slow (FS), and slow-fast (SF). For example, a corner designated as "FS" denotes fast NMOS FETs and slow PMOS FETs.

The first three corners (TT, FF, SS) are called even corners, because both types of devices are affected evenly, and generally do not adversely affect the logical correctness of the circuit. The resulting devices can function at slower or faster clock frequencies, and are often grouped or "binned" as such. The last two corners (FS, SF) are called "skewed" corners, and are cause for concern. This is because one type of FET will switch much faster than the other, and this form of imbalanced switching can cause one edge of the output to have much less slew than the other edge. Latching devices may then record incorrect values in a logic chain. In conventional IC design, design margins must be set so that an IC functions properly even within the skewed corners.

In addition to the transistors themselves, there are other on-chip variation (OCV) effects that manifest themselves at smaller technology nodes. These include PVT variation effects on on-chip interconnects as well as via structures. In addition, there are wafer-to-wafer and intra-wafer variations within the bulk material of wafers, both in initial form and post-doping.

Another problem in the translation of IC design to IC die is that in modern advanced transistor technologies, the power supply voltage is much lower compared to older technologies. For example, in 180 nm fabrication technology the recommended power supply voltage is 1.8V, while for 130 nm fabrication technology the recommended voltage is 1.2V, and for 28 nm fabrication technology the recommended voltage is 0.9V. In order to allow the implementation of fast transistors in these advanced technologies while the overdrive voltage is getting smaller and smaller due to reduced power supply voltages, the threshold voltage of the transistors is getting smaller and smaller in order to at least maintain or even increase the speed of the transistors. While decreasing the threshold voltage of the transistors in advanced technologies is mandatory and has a major speed impact on the technology behavior, it is also negatively impacts the current leakage performance of the technology: a smaller threshold voltage results in faster the devices, but faster devices have higher current leakage.

A number of approaches have been taken to compensate for the problems engendered by PVT dependent characteristics of advanced IC's. For example, one approach to dealing with performance differences caused by unique die-to-die response to an applied power supply voltage (i.e., where the same power supply voltage is provided to nominally identical but differently performing IC dies) is to provide for dynamic voltage scaling on an IC. FIG. 1 is a block diagram of a dynamic voltage scaling circuit 100 in accordance with the prior art. Dynamic voltage scaling (DVS) essentially includes the following:

Measurement of Local Voltage Dependent Die Characteristics:

Each IC is provided with means to measure the speed of the implementation technology as a function of applied voltage. Such a means may be a voltage dependent test circuit 102, such as a ring oscillator based on standard cell digital gates (even for an analog IC). As is known in the art, the frequency (i.e., speed) of such ring oscillators is dependent on the applied voltage and the implementation characteristics of the individual devices comprising the ring oscillator structure. The ring oscillators should be based on the standard cells sizes used in the design (e.g., 7-track, 10-track, 12-track, 14-track, etc.). Each ring oscillator also should be implemented using transistor types similar to the ones used on the IC in the region of the ring oscillator, such as ultra-high Vt (UHVT), high Vt (HVT), standard Vt (SVT), low Vt (LVT), and ultra-low Vt (ULVT) transistors.

Comparison of the Measured Characteristics to a Standard:

The output of the speed measuring means is compared to a reference value. For example, the output of the ring oscillators comprising the voltage dependent test circuit 102 may be compared against the output of a reference frequency source 104 (e.g., a crystal oscillator), using, for example, a comparator 106 comprising a delay-locked loop (DLL) to compare the reference frequency and the measured frequencies. The DLL output is a signal (generally a digital signal) that reflects the difference in frequency between the voltage dependent test circuit 102 and the reference frequency source 104.

Feedback Control of the Power Supply Voltage:

The output of the comparison of the reference frequency and the measured frequency from the comparator 106 is applied to a means for controlling an external power supply to the IC, such as a variable voltage regulator 108, adjusting the applied power supply higher or lower depending on the result of the frequency comparison. For example, the output of the comparison may be a pulse width modulation (PWM) signal. The PWM duty cycle can be used in known fashion to increase or decrease the power supply voltage in order to match the speed of the ring oscillators to the reference frequency. If the ring oscillators are operating too slow, the applied power supply voltage is increased; conversely, if the ring oscillators are operating too fast, the applied power supply voltage is decreased. A typical adjustment range for a power supply using this approach is about ±10% (e.g., for a normalized voltage value of 1.0, the range is from about 0.9 to 1.1).

An IC design normally would have multiple DVS cells 110 distributed judicially across the IC die such that the voltage dependent test circuits 102 (e.g., ring oscillators) rather thoroughly reflect the transistor speed variations that occur across the dimensions of the die. When using multiple DVS cells 110, some economies of scale will be readily apparent to those skilled in the art, such as having only one reference frequency source 104 coupled to all DVS cells 110, and time sharing (multiplexing) a single comparator 104 with all DVS cells 110.

Despite such attempts to mitigate the effects of PVT dependent characteristics on the fabrication of advanced IC's, IC designers and manufacturers have still been conservative in their approach to setting margins for IC designs. While a conservative approach seemingly improves die yields, the result generally is larger dies, more power usage (and thus more heat), and slower circuits on average.

Accordingly, there is a need for an IC design approach that mitigates the effects of PVT dependent characteristics on the fabrication of advanced IC's but provides high die yields, lower power usage, and faster circuits in comparison to the prior art. The present disclosure addresses this need.

SUMMARY OF THE INVENTION

The presently disclosed method and apparatus encompasses a method of designing an integrated circuit (IC) that mitigates the effects of process, voltage, and temperature (PVT) dependent characteristics on the fabrication of advanced IC's but provides high die yields, lower power usage, and faster circuits in comparison to the prior art.

The presently disclosed method and apparatus is based on a realization that the conventional design process still takes into account power supply voltage Vdd as a variable that must be considered in a skewed corner analysis. But a reconsideration of conventional design approaches has led to a realization that the IC design process can be substantially simplified by essentially factoring out voltage based variations in corner lot analysis for IC designs that include dynamic voltage scaling (DVS) circuitry. This is so because each fabricated IC die of an IC design having DVS can individually adjust the applied supply voltage Vdd within a range to offset local process-induced variations in the performance of that specific IC die.

By taking advantage of such DVS capability—denoted below as DVS' to reflect the usage of conventional DVS in conjunction with the improved characterization process of the presently disclosed method and apparatus—the corner analysis for an IC design can be significantly relaxed.

An important aspect of the presently disclosed method and apparatus is that an IC design has acceptable margins if the DVS' on-chip voltage adjustment range is sufficient to essentially fully offset (within an acceptable tolerance range) the out-of-specification voltage dependent frequency values of a process characterization of the IC design (e.g., through corner lot analysis). Accordingly, by boosting Vdd by using on-chip DVS' in an IC that would otherwise fall into a slow corner, the surprising result is that an IC design that would be unacceptable under conventional rules of design has perfectly valid design margins for the slow corners of a particular fabrication process.

In addition, a significant benefit of relaxing the design constraints by using DVS' for after-manufacture adjustments of Vdd is that IC die that fall in the fast corners can be operated at lower Vdd values while still approximately attaining a desired Fmax. An additional benefit of applying the presently disclosed method and apparatus is that it can potentially allow for digital IC designs to meet timing constraints much tighter (i.e., higher speed) than under a traditional approach because the average transistor speed is virtually increased due to power supply voltage adjustment using DVS'.

Knowing that the power supply voltage of an IC design with DVS' will be adjusted to guarantee in average transistors speed that covers the needs of the IC design, the design of both analog and digital IC's (or sections in an IC) can take this into account when implementing low level circuit blocks.

The disclosed method and apparatus includes the following aspects, which may be used to fabricate an IC: (1) designing the IC to meet a voltage dependent frequency specification, the IC design including feedback circuitry for controlling a power supply voltage to a fabricated instance of the IC design; (2) characterizing a fabrication process for the IC design at a range of power supply voltage levels achievable by the feedback circuitry; (3) validating the IC design against the fabrication process if the frequency specification is achievable for essentially all instances of the IC design fabricated in accordance with the fabrication process by adjustment of the power supply voltage levels applied to such instances of the IC design within the range of the power supply voltage levels achievable by the feedback circuitry; (4) fabricating instances of the IC design using the characterized fabrication process; and (5) adjusting the power supply voltage of each instance of the IC design using the feedback circuitry so as to cause each such instance of the IC design to meet the frequency specification.

The details of one or more embodiments of the present disclosure are set forth in the accompanying drawings and the description below. Other features, objects, and advantages will be apparent from the description and drawings, and from the claims.

DESCRIPTION OF THE DRAWINGS

FIG. 2 is a table showing the maximum normalized frequency Fmax at which an example IC design will operate at different normalized power supply levels Vdd with respect to different skewed corner types and temperatures.

FIG. 3 is a table showing the maximum normalized frequency Fmax at which an example IC design will operate at different normalized power supply levels Vdd with respect to different skewed corner types and temperatures, with certain emphasized values in bold type.

FIG. 4 is a table comparing cell area data for a digital IC design implemented using both conventional techniques and the presently disclosed method and apparatus.

FIG. 5 is a table comparing power consumption data for an analog IC design implemented using both conventional techniques and the presently disclosed method and apparatus.

FIG. 6 is a table comparing WNS, cell area, cell count, and percentage of ultra-low voltage threshold transistors for an IC design implemented using both conventional techniques and the presently disclosed method and apparatus at different standard library cell track sizes.

FIG. 8 is a table comparing WNS, cell area, cell count, and percentage of ultra-low voltage threshold transistors for an IC design implemented using both conventional techniques and the presently disclosed method and apparatus at the same standard library cell track size.

Like reference numbers and designations in the various drawings indicate like elements.

DETAILED DESCRIPTION

Figure 1:
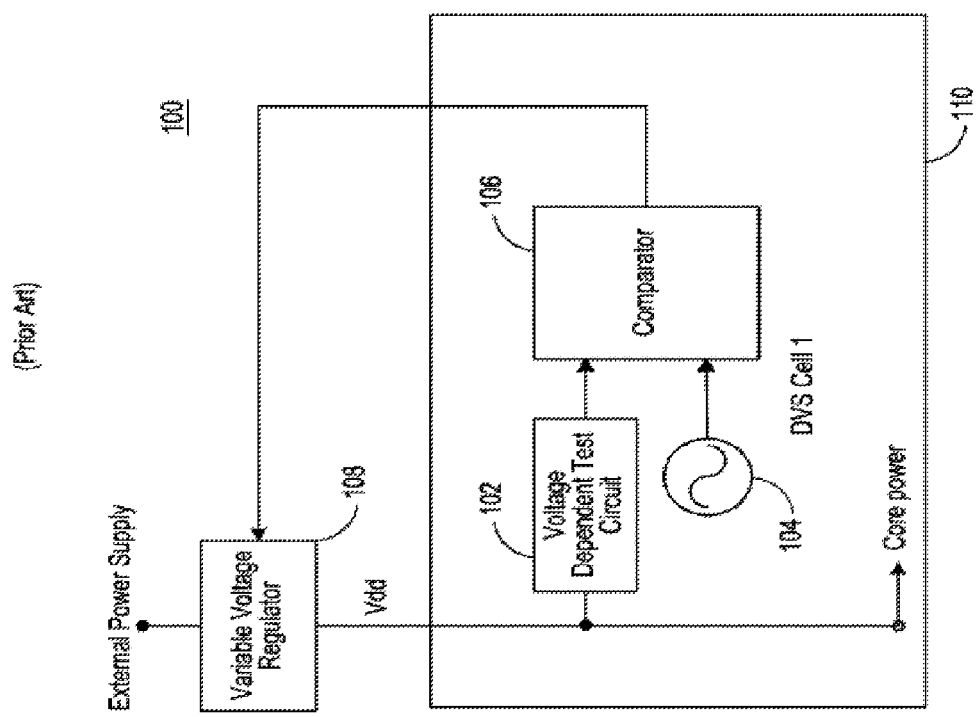
FIG. 1 is a block diagram of a dynamic voltage scaling circuit in accordance with the prior art.

The presently disclosed method and apparatus encompasses a method of designing an integrated circuit (IC) that mitigates the effects of process, voltage, and temperature (PVT) dependent characteristics on the fabrication of advanced IC's but provides high die yields, lower power usage, and faster circuits in comparison to the prior art.

As noted above, in conventional IC design, if every part of a circuit does not function at any of the characterization corners of a process, the design is considered to have inadequate design margin and must be redesigned. Accordingly, conventionally, design margins are conservatively set so that an IC functions properly even within the skewed corners.

For example, FIG. 2 is a table showing the maximum normalized frequency Fmax at which an example IC design will operate at different normalized power supply levels Vdd with respect to different skewed corner types and temperatures (that is, Fmax is the maximum operational frequency for a particular instance of an IC design embodied on a die). Under conventional design approaches, this IC design would not be acceptable, because the frequency performance in the two slow corners is far below (approximately half) the nominal level of 1.00. Accordingly, this IC would have to be redesigned so that Fmax in the slow corners, at all temperatures, was approximately 1.00 in order to meet the design specification (plus or minus some acceptable margin, such as 10%).

However, the presently disclosed method and apparatus is based on a realization that the conventional design process still takes into account power supply voltage Vdd as a variable that must be considered in a skewed corner analysis. But a reconsideration of conventional design approaches has led to a realization that the IC design process can be substantially simplified by essentially factoring out voltage based variations in corner lot analysis for IC designs that include dynamic voltage scaling (DVS) circuitry. This is so because each fabricated IC die of an IC design having DVS can individually adjust the applied supply voltage Vdd within a range (e.g., ±10%) to offset local process-induced variations in the performance of that specific IC die.

By taking advantage of such DVS capability—denoted hereafter as DVS' to reflect the usage of conventional DVS in conjunction with the improved characterization process of the presently disclosed method and apparatus—the corner analysis for an IC design can be significantly relaxed. For example, reconsidering the example IC design characterized in FIG. 2 with the power supply voltage Vdd factor essentially ignored leads to the conclusion that the design margins are in fact acceptable. To illustrate this, FIG. 3, which is otherwise identical to FIG. 2, shows certain values in bold type. Looking at these values for the example IC design, the desired performance is an Fmax of approximately 1.00 (±10% may be acceptable) for a Vdd of 1.00 at 27° C. (again, Fmax and Vdd values are normalized and thus have no dimensions per se). Using the process corresponding to the corner lots being analyzed, some IC dies would run unacceptably slow at low values of Vdd. In this example, at Vdd=0.90, Fmax is 0.55 at 27° C. and 0.48 at 40° C. for the two slow corners. However, the Vdd value can be dynamically adjusted for such slow corner dies after manufacture by using DVS'. In this example, by boosting Vdd from 0.90 to 1.10 for dies that fall into the slow corners, Fmax is 0.98 at 27° C. and 0.93 at 40° C., both within 10% of the desired Fmax of 1.00. Thus, the transistors double in speed and behave like nominal devices running at Vdd=1.00 at 27° C.

An important aspect of the presently disclosed method and apparatus is that an IC design has acceptable margins if the DVS' on-chip voltage adjustment range is sufficient to essentially fully offset (within an acceptable tolerance range) the out-of-specification voltage dependent frequency values of a process characterization of the IC design (e.g., through corner lot analysis).

Accordingly, by boosting Vdd by using on-chip DVS' in an IC that would otherwise fall into a slow corner, the surprising result is that an IC design that would be unacceptable under conventional rules of design has perfectly valid design margins for the slow corners of a particular fabrication process. In addition, a significant benefit of relaxing the design constraints by using DVS' for after-manufacture adjustments of Vdd is that IC die that fall in the fast corners can be operated at lower Vdd values while still approximately attaining the desired Fmax. In the example shown in FIG. 3, at Vdd=0.90, Fmax is 1.07 at 27° C. and 1.16 at 40° C. for the two fast corners, thus still slightly exceeding the Fmax specification of 1.0 while operating at a lower Vdd. Accordingly, reducing Vdd for these cases results in lower power consumption while still meeting the Fmax specification. Post-manufacture testing of the IC dies will allow binning of in-specification, low-power versions of the IC circuit, a commercially desirable result since such parts may be targeted for applications where low power is especially useful, such as portable electronic devices (e.g., mobile phones and tablet computers).

An additional benefit of applying the presently disclosed method and apparatus is that it can potentially allow for digital IC designs to meet timing constraints much tighter (i.e., higher speed) than under a traditional approach because the average transistor speed is virtually increased due to power supply voltage adjustment using DVS'.

Knowing that the power supply voltage of an IC design with DVS' will be adjusted to guarantee in average transistors speed that covers the needs of the IC design, the design of both analog and digital sections in an IC can take this into account when implementing low level circuit blocks. For example, it has been discovered that the presently disclosed method and apparatus allows both the number of buffers used within digital circuit blocks to be reduced and the drive strength of such buffers to be reduced, resulting in a smaller die and lower power consumption for IC designs utilizing such circuit blocks (alternatively, when using standard cell libraries, smaller cells can be used in such IC designs). This result arises from the fact that IC designs made in accordance with the presently disclosed method and apparatus do not have to have large margins built in to a particular design in order to overcome poor slow corner performance, as in the prior art. Large margins generally mean "over engineering" a circuit by using more and/or larger internal buffers or multiple core transistors to insure adequate drive levels and speed. Instead, in accordance with the presently disclosed method and apparatus, the use of DVS' drives the transistor cells of each digital IC die to the minimum drive strength necessary to achieve the target frequency.

The benefits of the presently disclosed method and apparatus apply to analog circuitry as well. As with digital designs, analog IC designs made in accordance with the presently disclosed method and apparatus will have lower current consumption due the extra headroom in their designs as a consequence of increasing the power supply voltage Vdd in slow corners. In addition, the ability to dynamically increase the power supply voltage Vdd in worst-case corners allows a designer to reduce transistor sizes (i.e., the transistor width/length ratio will be smaller) and hence parasitic capacitances in the design, thus allowing for higher frequency of operation.

Actual circuits designed in accordance with the presently disclosed method and apparatus have shown improvements in margins by a factor of three in comparison to implementing such circuits using the prior art design approach. Further, the reduction in the number of transistors that results when utilizing the presently disclosed method and apparatus for an IC design often allows the design to be implemented in a smaller track size; in one case, a 40% decrease in die area was achieved because an IC design could be moved from a 12-track to a 10-track implementation technology (a circuitry cell in a standard cell library is laid out relative to a grid defined by horizontal and vertical tracks, and a cell library is generally classified by its track height; for example, a 10-track library is composed of cells having heights of 10 tracks or an integer multiple thereof, and thus a 10-track library has smaller cell sizes than a 12-track library).

It should be noted that certain subcircuits of an IC design may need to be designed to meet target specifications in all corner lots without DVS' voltage adjustments; such subcircuits may include, for example low frequency analog-to-digital converters and bandgap voltage reference circuits. For such subcircuits, conservative design margins can be used. However, typically such subcircuits comprise only a small fraction of the circuitry in an IC design (often less than 1% to 2%), and hence do not detract significantly from applying the presently disclosed method and apparatus to the remaining circuitry.

EXAMPLES

The many advantages of the presently disclosed method and apparatus are better appreciated by considering specific examples of its application.

FIG. 4 is a table comparing cell area data for a digital IC design implemented using both conventional techniques and the presently disclosed method and apparatus, in this case an ARM Processor CortexA9MP running at 1 GHz. When the same IC design is implemented using the DVS' approach, the design margins are relaxed sufficiently that the cell area is 18.5% less than when implemented using conventional design rules.

FIG. 5 is a table comparing power consumption data for an analog IC design implemented using both conventional techniques and the presently disclosed method and apparatus, in this case a Multimedia over Coax Alliance (MoCA) Transceiver. Comparing various ON and OFF states for transmit (Tx) and receive (Rx) conditions for the IC design, with DVS' and without DVS' (i.e., a conventional implementation) for different MoCA modes (as defined in the MoCA specification), there is an average of a 15% power improvement with DVS' compared to a conventional design.

FIG. 6 is a table comparing WNS (worst negative slack; negative slack implies that a path is too slow, and the path must be sped up or a reference signal delayed if the whole circuit is to work at the desired speed), cell area, cell count, and percentage of ultra-low voltage threshold transistors for an IC design implemented using both conventional techniques and the presently disclosed method and apparatus at different standard library cell track sizes. In this case, involving modules of a video transcoding application, the better design margins of the DVS' design approach allow use of a smaller 10-track standard cell library compared to the 12-track library used in the conventional design, resulting in significantly smaller cell areas as well as lower cell counts in every case. Lower cell counts alone will result in lower power consumption. In addition, the DVS' design approach avoids having to use any ultra-low voltage threshold (ULVt) transistors (which are high speed, high leakage devices) to achieve the performance specification, which will result in a significant decrease in power consumption with the DVS' IC design.

Figure 7:
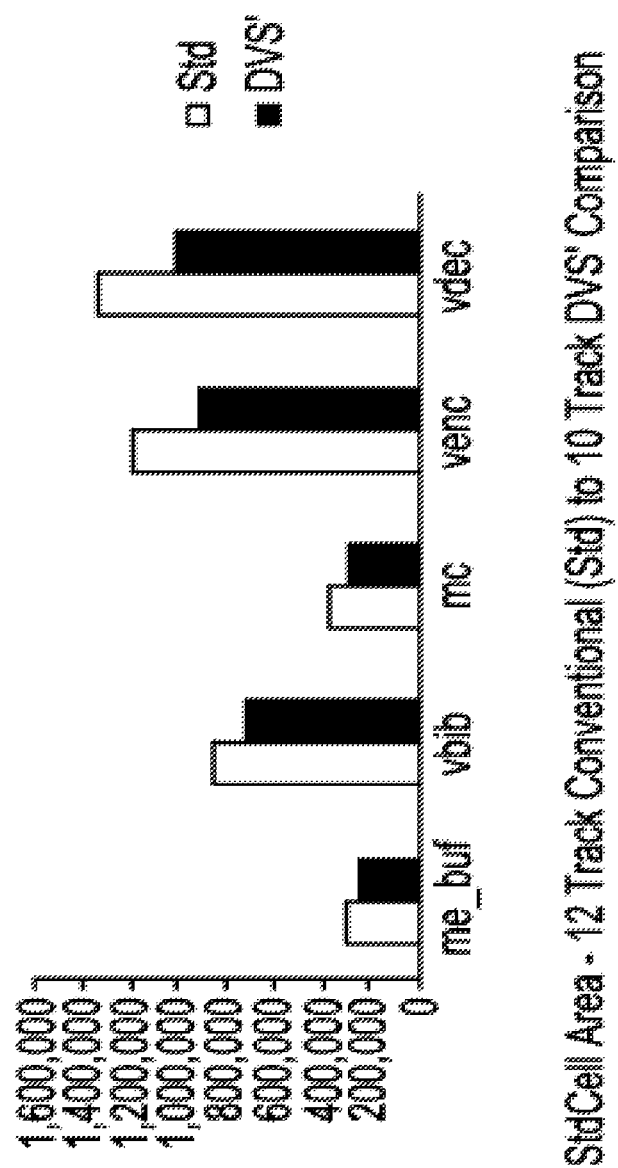
FIG. 7 is a chart comparing cell area for an IC design implemented using both conventional techniques and the presently disclosed method and apparatus at different standard library cell track sizes.

FIG. 7 is a chart comparing cell area for an IC design implemented using both conventional techniques and the presently disclosed method and apparatus at different standard library cell track sizes; the data is from FIG. 6 and graphically shows the significant decrease in cell area achieved by use of the presently disclosed method and apparatus.

FIG. 8 is a table comparing WNS, cell area, cell count, and percentage of ULVt transistors for an IC design implemented using both conventional techniques and the presently disclosed method and apparatus at the same standard library cell track size. In this case, also involving modules of a video transcoding application, the better design margins of the DVS' design approach result in a significant decrease in cell area and cell count even while using the same 10-track standard cell library in comparison to a conventional design. In addition, the DVS' design approach avoids having to use any ULVt transistors to achieve the performance specification, which will result in a significant decrease in power consumption by the DVS' IC design.

Figure 9:
FIG. 9 is a chart comparing cell area for an IC design implemented using both conventional techniques and the presently disclosed method and apparatus at the same standard library cell track size.

FIG. 9 is a chart comparing cell area for an IC design implemented using both conventional techniques and the presently disclosed method and apparatus at the same standard library cell track size; the data is from FIG. 8 and graphically shows the significant decrease in cell area achieved by use of the presently disclosed method and apparatus.

Figure 10:
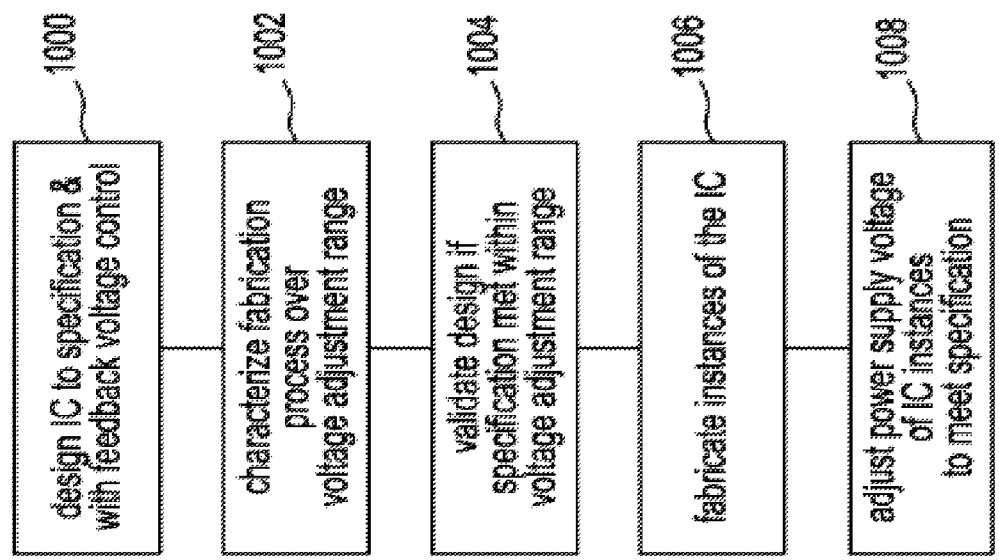
FIG. 10 is a flowchart of one embodiment of the method of the presently disclosed method and apparatus.

FIG. 10 is a flowchart of one embodiment of the presently disclosed method and apparatus, and includes:

Initial Design (1000)—designing an IC to meet a voltage dependent frequency specification, the IC design including feedback circuitry for controlling a power supply voltage to a fabricated instance of the IC design;

Characterization (1002)—characterizing a fabrication process for the IC design at a range of power supply voltage levels achievable by the feedback circuitry;

Validation (1004)—validating the IC design against the fabrication process if the frequency specification is achievable for essentially all instances of the IC design fabricated in accordance with the fabrication process by adjustment of the power supply voltage levels applied to such instances of the IC design within the range of the power supply voltage levels achievable by the feedback circuitry;

Fabrication (1006)—fabricating instances of the IC design using the characterized fabrication process; and Adjustment (1008)—adjusting the power supply voltage of each instance of the IC design using the feedback circuitry so as to cause each such instance of the IC design to meet the frequency specification.

Another embodiment of the presently disclosed method and apparatus includes:

Initial Design—designing an IC to meet a voltage dependent frequency specification, the IC design including feedback circuitry for controlling a power supply voltage to a fabricated instance of the IC design;

Characterization: characterizing a fabrication process by means of corner lots for the IC design at a range of power supply voltage levels achievable by the feedback circuitry;

Validation—validating the IC against the fabrication process if the frequency specification is achievable in all corners of the corner lots for essentially all instances of the IC design fabricated in accordance with the fabrication process by adjustment of the power supply voltage levels applied to such instances of the IC design within the range of the power supply voltage levels achievable by the feedback circuitry;

Fabrication—fabricating instances of the IC design using the characterized fabrication process; and Adjustment—adjusting the power supply voltage of each instance of the IC design using the feedback circuitry so as to cause each such instance of the IC design to meet the frequency specification.

The feedback circuitry may include:

means for measurement of local voltage dependent die characteristics;

means for comparison of the measured characteristics to a standard; and means responsive to the comparison for feedback control of the power supply voltage for an instance of the IC design.

Alternatively, the feedback circuitry may include:

at least one ring oscillator distributed on an instance of the IC design for measurement of local voltage dependent characteristics, each such ring oscillator outputting a corresponding voltage dependent frequency signal;

a comparator for comparison of at least one voltage dependent frequency signal to a selected reference frequency and for outputting a signal that reflects the difference in frequency between at least one ring oscillator and the selected reference frequency; and a closed-loop feedback control circuit for adjusting the power supply voltage to an instance of the IC design as a function of the comparator output signal.

Another aspect includes integrated circuit products that include feedback circuitry for controlling a power supply voltage to the integrated circuit products and which are manufactured by the inventive process.

A number of embodiments of the disclosed method and apparatus have been described. It is to be understood that various modifications may be made without departing from the spirit and scope of the invention. In particular, the invention encompasses numerous other embodiments of the disclosed method and apparatus having equivalent structure and/or function. For example, some of the steps described above may be order independent, and thus can be performed in an order different from that described. Accordingly, it is to be understood that the foregoing description is intended to illustrate and not to limit the scope of the invention, which is defined by the claims presented and the equivalents thereof.

What is claimed is:

1. A method for designing an integrated circuit ("IC"), comprising:
   (a) designing the IC to meet a voltage dependent frequency specification, the IC design including feedback circuitry for controlling a power supply voltage to a fabricated instance of the IC design;
   (b) characterizing a fabrication process for corner lots for the IC design at a range of power supply voltage levels achievable by the feedback circuitry; and
   (c) validating the IC design against the fabrication process if the frequency specification is achievable for essentially all instances of the IC design fabricated in accordance with the fabrication process by adjustment of the power supply voltage levels applied to such instances of the IC design within the range of the power supply voltage levels achievable by the feedback circuitry, and repeating (b) when essentially all fabricated instances of the IC design do not meet the frequency specification, wherein the feedback circuitry in each IC resulting from the IC design is operable to respectively adjust the power supply voltage of each IC resulting from the IC design by reducing the power supply voltage if the IC is from a fast corner lot and increasing power supply voltage if the IC is from a slow corner lot.

2. The method of claim 1, wherein the feedback circuitry comprises:
   (a) at least one ring oscillator distributed on each IC resulting from the IC design for measurement of local voltage dependent characteristics, each such ring oscillator outputting a corresponding voltage dependent frequency signal;
   (b) a comparator for comparison of at least one voltage dependent frequency signal to a selected reference frequency and for outputting a signal that reflects the difference in frequency between at least one ring oscillator and the selected reference frequency; and
   (c) a closed-loop feedback control circuit for adjusting the power supply voltage to an IC of the IC design as a function of the comparator output signal.

3. The method of claim 1, wherein the feedback circuitry comprises:
   (a) means for measuring local voltage dependent die characteristics;
   (b) means for comparing the measured characteristics to a standard; and
   (c) means for responding to the comparison for feedback control of the power supply voltage for an IC resulting from the IC design.

4. A method for designing an integrated circuit ("IC"), comprising:
   (a) designing the IC to meet a voltage dependent frequency specification, the IC design including feedback circuitry for controlling a power supply voltage to a fabricated instance of the IC design;
   (b) characterizing a fabrication process by means of corner lots for the IC design at a range of power supply voltage levels achievable by the feedback circuitry; and
   (c) validating the IC against the fabrication process if the frequency specification is achievable in all corners of the corner lots for essentially all ICs resulting from the IC design fabricated in accordance with the fabrication process by adjustment of the power supply voltage levels applied to such ICs resulting from the IC design within the range of the power supply voltage levels achievable by the feedback circuitry, and repeating (b) when essentially all fabricated instances of the IC design do not meet the frequency specification, wherein feedback circuitry in each IC resulting from the IC design is operable to respectively adjust the power supply voltage of each IC resulting from the IC design by reducing the power supply voltage if the IC is from a fast corner lot and increasing power supply voltage if the IC is from a slow corner lot.

5. The method of claim 4, wherein the feedback circuitry comprises:
   (a) at least one ring oscillator distributed on an IC resulting from the IC design for measurement of local voltage dependent characteristics, each such ring oscillator outputting a corresponding voltage dependent frequency signal;
   (b) a comparator for comparison of at least one voltage dependent frequency signal to a selected reference frequency and for outputting a signal that reflects the difference in frequency between at least one ring oscillator and the selected reference frequency; and
   (c) a closed-loop feedback control circuit for adjusting the power supply voltage to the IC resulting from the IC design as a function of the comparator output signal.

6. The method of claim 4 wherein the feedback circuitry comprises:
   (a) means for measuring local voltage dependent die characteristics;
   (b) means for comparing the measured characteristics to a standard; and
   (c) means for responding to the comparison for feedback control of the power supply voltage for an IC resulting from the IC design.

7. An integrated circuit ("IC") prepared by a process comprising:
   (a) designing the IC to meet a voltage dependent frequency specification, the IC design including feedback circuitry for controlling a power supply voltage to an IC resulting from the IC design;
   (b) characterizing a fabrication process for the IC design at a range of power supply voltage levels achievable by the feedback circuitry;
   (c) validating the IC design against the fabrication process if the frequency specification is achievable for essentially all ICs resulting from the IC design fabricated in accordance with the fabrication process by adjustment of the power supply voltage levels applied to such ICs resulting from the IC design within the range of the power supply voltage levels achievable by the feedback circuitry, and repeating (b) when essentially all fabricated instances of the IC design do not meet the frequency specification, wherein feedback circuitry is operable to adjust the power supply voltage of the IC by increasing the power supply voltage if the IC is from a slow corner lot and decreasing the power supply voltage if the IC is from a fast corner lot.

8. The integrated circuit ("IC") of claim 7, wherein the feedback circuitry comprises:
   (a) at least one ring oscillator distributed on the IC for measurement of local voltage dependent characteristics, each such ring oscillator outputting a corresponding voltage dependent frequency signal;

(b) a comparator for comparison of at least one voltage dependent frequency signal to a selected reference frequency and for outputting a signal that reflects the difference in frequency between at least one ring oscillator and the selected reference frequency; and (c) a closed-loop feedback control circuit for adjusting the power supply voltage to the IC as a function of the comparator output signal.

9. The integrated circuit ("IC") of claim 7, wherein the feedback circuitry comprises:
   (a) means for measuring local voltage dependent die characteristics;
   (b) means for comparing the measured characteristics to a standard; and
   (c) means for responding to the comparison for feedback control of the power supply voltage for the IC.

10. An integrated circuit ("IC") prepared by a process comprising:
    (a) designing the IC to meet a voltage dependent frequency specification, the IC design including feedback circuitry for controlling a power supply voltage to an IC resulting from the IC design;
    (b) characterizing a fabrication process by means of corner lots for the IC design at a range of power supply voltage levels achievable by the feedback circuitry; and
    (c) validating the IC against the fabrication process if the frequency specification is achievable in all corners of the corner lots for essentially all ICs resulting from the IC design fabricated in accordance with the fabrication process by adjustment of the power supply voltage levels applied to such ICs resulting from the IC design within the range of the power supply voltage levels achievable by the feedback circuitry, and repeating (b) when essentially all fabricated instances of the IC design do not meet the frequency specification, wherein the feedback circuitry is operable to adjust the power supply voltage of the IC using the feedback circuitry by reducing the power supply voltage if the IC is from a fast corner lot and increasing power supply voltage if the IC is from a slow corner lot.

11. The integrated circuit ("IC") of claim 10, wherein the feedback circuitry comprises:
    (a) at least one ring oscillator distributed on the IC for measurement of local voltage dependent characteristics, each such ring oscillator outputting a corresponding voltage dependent frequency signal;
    (b) a comparator for comparison of at least one voltage dependent frequency signal to a selected reference frequency and for outputting a signal that reflects the difference in frequency between at least one ring oscillator and the selected reference frequency; and
    (c) a closed-loop feedback control circuit for adjusting the power supply voltage to the IC as a function of the comparator output signal.

12. The integrated circuit ("IC") of claim 10, wherein the feedback circuitry comprises:
    (a) means for measuring local voltage dependent die characteristics;
    (b) means for comparing the measured characteristics to a standard; and
    (c) means for responding to the comparison for feedback control of the power supply voltage for the IC.

13. An integrated circuit ("IC") including feedback circuitry for controlling a power supply voltage to the IC to meet a voltage dependent frequency specification, wherein the adjustment of the power supply voltage is determined by (1) characterization of a fabrication process for the IC at a range of power supply voltage levels achievable by the feedback circuitry, and (2) validation of the design of the IC against the fabrication process if the voltage dependent frequency specification is achievable for essentially all instances of the IC fabricated in accordance with the fabrication process and repeating (1) when essentially all fabricated instances of the IC design do not meet the voltage dependent frequency specification, wherein the feedback circuitry is operable to adjust power supply voltage levels in each instance of the IC within the range of the power supply voltage levels achievable by the feedback circuitry by reducing the power supply voltage if the IC is from a fast corner lot and increase the power supply voltage if the IC is from a slow corner lot.

14. The integrated circuit ("IC") of claim 13, wherein the feedback circuitry comprises:
    (a) at least one ring oscillator distributed on the IC for measurement of local voltage dependent characteristics, each such ring oscillator outputting a corresponding voltage dependent frequency signal;
    (b) a comparator for comparison of at least one voltage dependent frequency signal to a selected reference frequency and for outputting a signal that reflects the difference in frequency between at least one ring oscillator and the selected reference frequency; and
    (c) a closed-loop feedback control circuit for adjusting the power supply voltage to the IC as a function of the comparator output signal.

15. The integrated circuit ("IC") of claim 13, wherein the feedback circuitry comprises:
    (a) means for measuring local voltage dependent die characteristics;
    (b) means for comparing the measured characteristics to a standard; and
    (c) means for responding to the comparison for feedback control of the power supply voltage for the IC.

\* \* \* \* \*